(12) United States Patent  
Kumar et al.

(10) Patent No.: US 8,757,105 B2
(45) Date of Patent: *Jun. 24, 2014

(54) SYSTEM AND METHOD FOR CONTROLLING LIQUID LEVEL IN A VESSEL

(75) Inventors: Rajeeva Kumar, Clifton Park, NY (US); Karl Dean Minto, Ballston Lake, NY (US); Charudatta Subhash Mehendale, Niskayuna, NY (US); Erhan Karaca, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1499 days.

This patent is subject to a terminal disclaimer.

(21) Appl. No.: 12/329,753

(22) Filed: Dec. 8, 2008

(65) Prior Publication Data

US 2010/0139392 A1 Jun. 10, 2010

(51) Int. Cl.
 *F22D 5/26* (2006.01)
(52) U.S. Cl.
 USPC .......................... 122/451 R; 137/11; 137/386
(58) Field of Classification Search
 USPC ............. 122/448.1, 451 R, 504; 137/11, 386, 137/453, 454, 391; 700/281, 282
 See application file for complete search history.

(56) References Cited

U.S. PATENT DOCUMENTS

| | | | |
|---|---|---|---|
| 4,242,989 A | 1/1981 | Chamberlain | |
| 4,275,382 A * | 6/1981 | Jannotta | 340/870.16 |
| 4,433,646 A | 2/1984 | Zadiraka | |
| 4,707,778 A | 11/1987 | Yamada et al. | |
| 4,777,009 A | 10/1988 | Singh et al. | |
| 4,791,889 A | 12/1988 | Matsko et al. | |
| 5,027,751 A | 7/1991 | Archer et al. | |
| 5,148,775 A | 9/1992 | Peet | |
| 5,279,263 A | 1/1994 | Cameau et al. | |

(Continued)

FOREIGN PATENT DOCUMENTS

| | | |
|---|---|---|
| CN | 1282849 A | 2/2001 |
| CN | 2433514 Y | 6/2001 |

(Continued)

OTHER PUBLICATIONS

Search Report and Written Opinion from corresponding EP Application No. 09177792.0-2209 dated Apr. 16, 2010.

(Continued)

*Primary Examiner* — Gregory A Wilson
(74) *Attorney, Agent, or Firm* — Ann M. Agosti

(57) ABSTRACT

A level control system for controlling a liquid level in a vessel containing a two-phase fluid includes a plurality of sensors configured to measure parameters related to the vessel. The parameters include liquid level in the vessel, vapor flow rate leaving the vessel, pressure in the vessel, temperature of the vessel, and feed-liquid flow rate entering the vessel indicative of a state of the vessel. A predictive controller is configured to receive output signals from the plurality of sensors and predict a volume of liquid over a predetermined time period in the vessel based on output signals from the plurality of sensors and a variation in pressure, thermal load, or combinations thereof in the vessel. The controller is configured to generate a liquid level set point of the vessel based on the predicted volume of liquid in the vessel; and further control a liquid level in the vessel based on the generated liquid level set point by manipulating one or more control elements coupled to the vessel.

25 Claims, 3 Drawing Sheets

(56) References Cited

U.S. PATENT DOCUMENTS

| | | |
|---|---|---|
| 6,520,122 B2 * | 2/2003 | Kemp et al. ............... 122/504.2 |
| 7,053,341 B2 | 5/2006 | Arora et al. |
| 7,249,573 B2 * | 7/2007 | Kemp et al. ................. 122/504 |
| 7,628,067 B2 | 12/2009 | Yoshinari et al. |
| 7,931,041 B2 * | 4/2011 | Mehendale et al. ........... 137/11 |
| 8,397,679 B2 * | 3/2013 | Kozaki ......................... 122/488 |
| 8,463,445 B2 * | 6/2013 | Kumar et al. ................. 700/281 |
| 2002/0144662 A1 | 10/2002 | Kemp et al. |
| 2006/0070438 A1 * | 4/2006 | Hatfield et al. ................. 73/301 |
| 2006/0120502 A1 | 6/2006 | Tomiki et al. |

FOREIGN PATENT DOCUMENTS

| | | | |
|---|---|---|---|
| CN | 1749890 | A | 3/2006 |
| CN | 201138211 | Y | 10/2008 |
| JP | 5929901 | A | 2/1984 |
| JP | 613904 | A | 1/1986 |
| JP | 2006046874 | A | 2/2006 |
| JP | 2008089207 | A | 4/2008 |
| WO | 9218808 | A1 | 10/1992 |

OTHER PUBLICATIONS

Unofficial English translation of Office Action issued in connection with corresponding CN Application No. 200910260571.8 on Jul. 3, 2013.

Notice of Allowance from corresponding JP Application No. 2009-276037 dated Oct. 4, 2013.

Peet, W.J. & Leung, T.K.P.; "Improved Drum Level Control for Load Cycling"; Advances in Power System Control, Operation and Management, 1993. APSCOM-93., 2nd International Conference on Dec. 7-10, 1993; vol. 1.; pp. 130-134.

VanLandingham, H.F. & Tripathi, N.D.; "Knowledge-based adaptive fuzzy control of drum level in a boiler system"; Southcon/96. Conference Record; Publication Date: Jun. 25-27, 1996, pp. 454-459.

Unofficial English translation of Office Action issued in connection with corresponding CN Application No. 200910260571.8 on Feb. 20, 2014.

* cited by examiner

SYSTEM AND METHOD FOR CONTROLLING LIQUID LEVEL IN A VESSEL

BACKGROUND

The system and method disclosed herein relate generally to controlling liquid level in a vessel and, more specifically, to predictive controlling of water level in a drum type boiler in a power plant.

Drum type boilers are the most commonly used boilers in power generation plants. In the power generation industry, drum level trips due to ineffective drum level control response during transient operations are a primary cause of disruption in power generation and lead to a huge loss of plant availability and revenue.

Control of drum water level is a challenging problem due to complicated dynamics of two-phase flows, presence of waves, unknown heat and pressure disturbances, and load demands. Maintaining water level within limits is critical, as exceeding the limits will lead to trips or damage the equipment. A drop in water level will cause thermal fatigue in the drum. An increase in water level significantly increases the possibility of water droplets entering a superheater/steam turbine and thus damaging the superheater/steam turbine.

Conventional approaches to control of water level typically include actuation of a feed water control valve that supplies water to the drum in reaction to observed changes in level and steam flowrate. However, such approaches to control water level are challenging for drum type boilers, especially during transient operating conditions due to inverse response exhibited by such systems.

In the conventional approach, the water level is controlled so as to attain a fixed water level set point. Moreover, the controller is a reactive type controller i.e. the controller does not anticipate the control action required. The controller also does not take into account the variation in drum states/conditions (water level, pressure, temperature, or the like) and predicted disturbances (thermal load and pressure variations). The conventional approach does not provide trip free operation of the plant or provide enough time for an operator to intervene if a need arises.

There is a need for a more effective technique for controlling a liquid level in a vessel, such as for example, predictive control of liquid level in a drum type boiler, especially during transient operating conditions.

BRIEF DESCRIPTION

In accordance with an exemplary embodiment of the present invention, a level control system for controlling a liquid level in a vessel containing a two-phase fluid is disclosed. The system includes a plurality of sensors configured to measure parameters related to the vessel. The parameters include liquid level in the vessel, vapor flow rate from the vessel, pressure in the vessel, temperature of the vessel, and feed-liquid flow rate into the vessel indicative of a state of the vessel. A predictive controller is configured to receive output signals from the plurality of sensors and predict a volume of liquid in the vessel based on output signals from the plurality of sensors and a variation in pressure, thermal load, or combinations thereof in the vessel. The controller is configured to further generate a liquid level set point of the vessel based on the predicted volume of liquid over a predetermined time period in the vessel; and control a liquid level in the vessel based on the generated liquid level set point by manipulating one or more control elements coupled to the vessel.

In accordance with another exemplary embodiment of the present invention, a level control system for controlling a liquid level in a vessel containing a two-phase fluid is disclosed. The system includes a plurality of sensors configured to measure parameters related to the vessel. The parameters include liquid level in the vessel, vapor flow rate from the vessel, pressure in the vessel, temperature of the vessel, and feed-liquid flow rate into the vessel indicative of a state of the vessel. A predictive controller is configured to receive output signals from the plurality of sensors and control a liquid level in the vessel based on the output signals from the plurality of sensors. The controller includes a volume prediction unit configured to predict a volume of liquid in the vessel based on output signals from the plurality of sensors and a variation in pressure, thermal load, or combinations thereof in the vessel. A set point generation unit is configured to generate a liquid level set point of the vessel based on the predicted volume of liquid over a predetermined time period in the vessel. A liquid level control unit is configured to control a liquid level in the vessel based on the generated liquid level set point by manipulating one or more control elements coupled to the vessel.

In accordance with another exemplary embodiment of the present invention, a level control system for controlling a water level in a boiler drum containing a two-phase fluid is disclosed. The system includes a plurality of sensors configured to measure parameters related to the boiler drum. The parameters include water level in the boiler drum; steam flow rate from the boiler drum; pressure in the boiler drum, temperature of the boiler drum, and feed-water flow rate into the boiler drum indicative of a state of the boiler drum. A predictive controller is configured to receive output signals from the plurality of sensors and predict a volume of water in the boiler drum based on output signals from the plurality of sensors and a variation in pressure, thermal load, or combinations thereof in the boiler drum. The controller is configured to generate a water level set point of the boiler drum based on the predicted volume of water over a predetermined time period in the vessel; and further control a water level in the boiler drum based on the generated water level set point by manipulating one or more control elements coupled to the boiler drum.

In accordance with yet another exemplary embodiment of the present invention, a method for controlling a liquid level in a vessel containing a two-phase fluid is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a level control system for controlling a liquid level in a vessel containing a two-phase fluid, for example both liquid and vapor phases of water. The system includes a plurality of sensors configured to measure parameters related to the vessel. The parameters include liquid level in the vessel, vapor flow rate leaving the vessel, pressure in the vessel, temperature of the vessel; and feed-liquid flow rate into the vessel. A predictive controller is configured to receive output signals from the plurality of sensors and predict a volume of liquid in the vessel based on output signals from the plurality of sensors and a variation in pressure, thermal load, or combinations thereof in the vessel. The controller is configured to generate a liquid level set point of the vessel based on the predicted volume of liquid in the vessel; and further control a liquid level in the vessel based on the generated liquid level set point by manipulating one or more control elements coupled to the vessel.

In accordance with another exemplary embodiment of the present invention, a level control system for controlling a water level in a boiler drum containing a two-phase fluid i.e. water and steam is disclosed. In accordance with yet another exemplary embodiment of the present invention, a method for controlling a liquid level in a vessel containing a two-phase fluid is disclosed. It should be noted herein that the exemplary controller is a "predictive" controller that adjusts a liquid volume inventory in a way that is suited for safe liquid level operation based on a current state and the expected disturbances of the vessel. In a combined cycle power generation system, the protocol for operating the system is standard resulting in predictable disturbances. The predictive controller takes corrective measures even before the disturbances affect the liquid level in the vessel adversely. Although the embodiments described below are with reference to controlling water level in a boiler drum, the exemplary system and method are equally applicable to safe operation of other systems comprising a vessel containing at least a two-phase fluid with another example being the control of a level of liquid helium in superconducting cavities.

Figure 1:
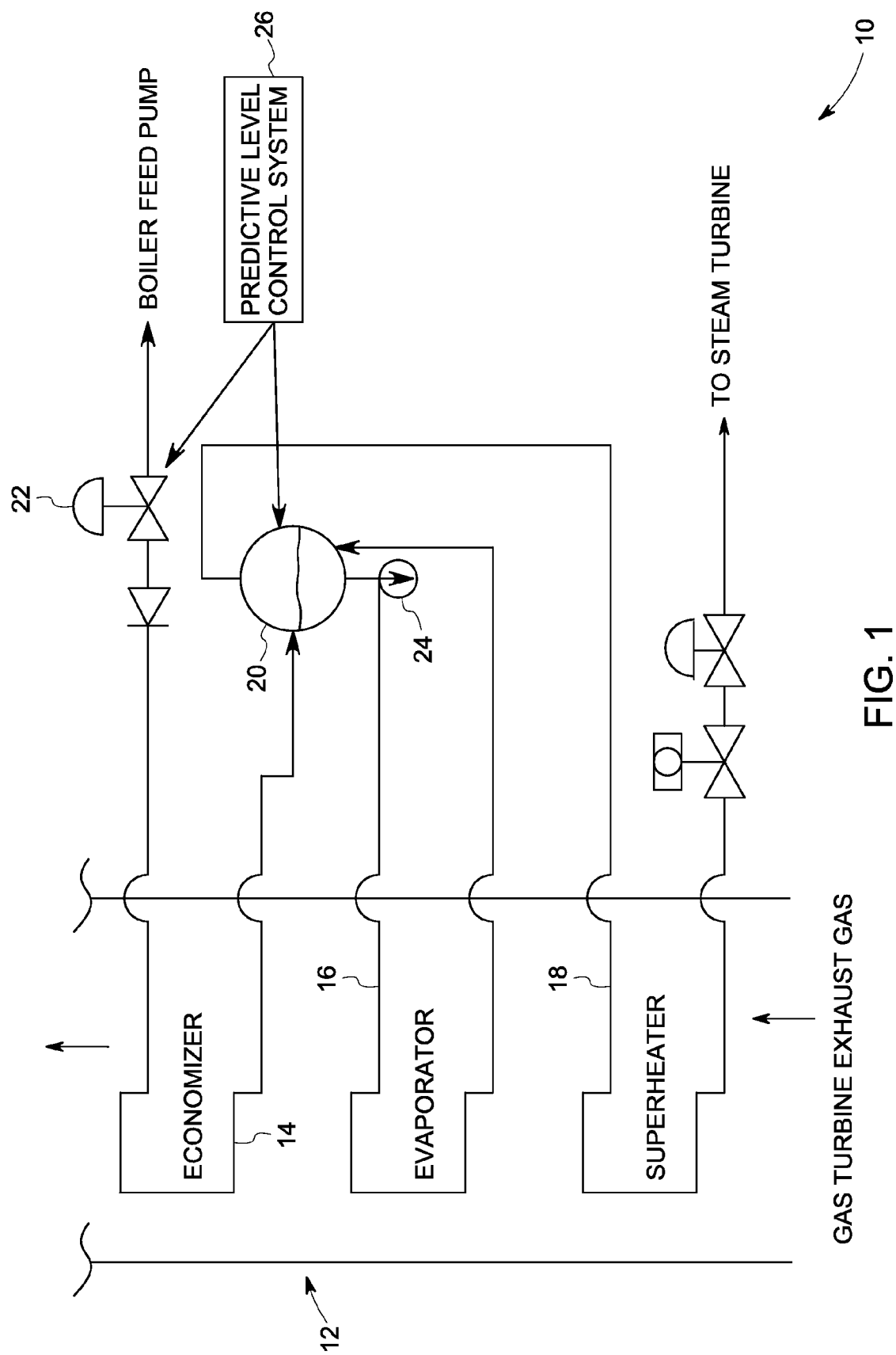
FIG. 1 is a diagrammatical view of a portion of a combined cycle power plant, illustrating a boiler drum with a predictive liquid level control system in accordance with an exemplary embodiment of the present invention.

Referring to FIG. 1, an exemplary combined cycle power plant 10 is illustrated. The combined cycle power plant 10 includes at least one gas turbine-generator and at least one steam turbine-generator interconnected via a heat recovery steam generator (HRSG) 12. Hot exhaust gas from a gas turbine is input into the HRSG 12 to produce steam for a steam turbine. The HRSG 12 may be divided into a plurality of sections such as an economizer 14, evaporator 16, and a superheater 18. Further, as part of the steam producing cycle, a boiler drum 20 is coupled to HRSG 12. A boiler feed pump is configured to supply feed water to the boiler drum 20 via a feed water control valve 22. The boiler drum 20 is also coupled to a blow down valve 24 configured to remove excess water from the boiler drum 20. Descriptions of cycle operation are currently available to those having ordinary skill in the art and need not be further explained in order to obtain an understanding of the combined cycle power plant 10.

In the illustrated embodiment of FIG. 1, a predictive level control system 26 is provided for controlling water level in the boiler drum 20. As discussed previously, control of drum water level is a challenging problem due to complicated dynamics of two-phase flows, presence of waves, unknown heat and pressure disturbances and load demands. Maintaining water level within limits is necessary to avoid trips and damage to equipment. In the case of power generation systems equipped with drum boilers, the major disturbances to the drum water level are the transient pressure disturbances and heat flux disturbances. The illustrated level control system 26 is configured to effectively control drum water level during such disturbances. Details of the level control system 26 are explained in greater detail below with reference to subsequent figures.

Figure 2:
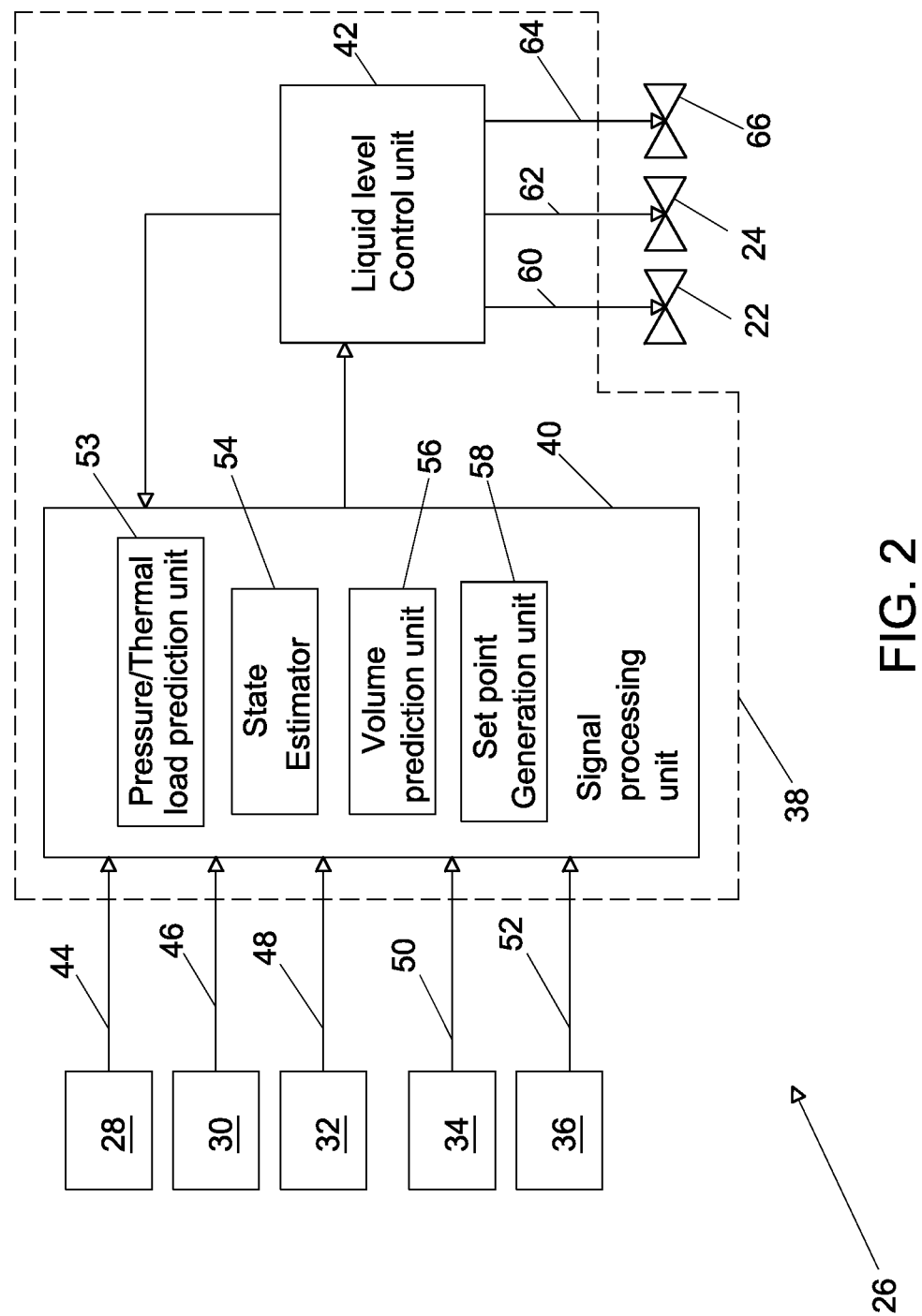
FIG. 2 is a diagrammatical view of a predictive water level control system in accordance with the aspects of FIG. 1.

Referring to FIG. 2, a level control system 26 is illustrated in accordance with the aspects of FIG. 1. As discussed above, the level control system 26 is configured for controlling the water level in the boiler drum (20 shown in FIG. 1) having two-phase fluid. The level control system 26 includes a plurality of sensors configured to measure parameters related to the boiler drum. In the illustrated embodiment, the plurality of sensors include a drum level sensor 28 configured to detect water level in the boiler drum, steam flow sensor 30 configured to measure steam flow rate leaving the drum, a pressure sensor 32 configured to measure pressure in the boiler drum, temperature sensor 34 configured to measure temperature of the drum, and feed-water flow sensor 36 configured to measure feed-water flow rate entering the drum. The system 26 also includes a predictive controller 38 having a signal processing unit 40, and a liquid level control unit 42. The controller 38 is configured to receive output signals 44, 46, 48, 50, and 52 from the sensors 28, 30, 32, 34, and 36 respectively and control a water level in the boiler drum based on the output signals 44, 46, 48, 50, and 52. Controller 38 and the units described herein may be embodied in one or more physical computing units.

In the illustrated embodiment, the signal processing 40 includes a state estimator 54, volume prediction unit 56, and a set point generation unit 58. The state estimator 54 is configured to estimate a "state" of the boiler drum based on the output signals 44, 46, 48, 50, and 52 from the sensors 28, 30, 32, 34, and 36 respectively and also an output of the liquid level control unit 42. The state of the boiler drum may include parameters including water level, pressure, temperature, feed water flow rate, steam flow rate, or combinations thereof related to the drum. The volume prediction unit 56 is configured to predict a volume of water in the boiler drum based on the state of the drum (output signals 44, 46, 48, 50, and 52 indicative of sensor measurements), current output of the liquid level control unit 42, and current and/or expected disturbances (variation in pressure, thermal load, or combinations thereof related to the drum) within a predetermined time window/period. It should be noted herein that in the current context, "volume" of water might also be referred to as "level" of water including the water bubbles in the boiler drum. The set point generation unit 58 is configured to generate a water level set point of the boiler drum based on the predicted volume of water in the boiler drum. In one embodiment, the water level set point may be generated off-line based on a computer model of the system and expected disturbances. In such an embodiment, the water level set point is pre-computed by the predictive controller 38 for various initial states of the boiler drum and different disturbance profiles. The computed liquid level set point is then used during operation. The choice of the liquid level set point to be followed during operation is based on sensor measurements, disturbances, or the like. It should be noted herein that for each control cycle, the predicted volume of water is constantly updated, and the water level set point is updated based on the updated predicted volume of water based on the state of the drum, and estimated or expected disturbances, or both.

The liquid level control unit 42 is configured to control the water level in the boiler drum based on the generated water level set point by manipulating one or more control elements coupled to the boiler drum. In the illustrated embodiment, the liquid level control unit 42 is configured to output signals 60, 62, 64 so as to control the water level in the boiler drum to the water level set point by manipulating the feed-water control valve 22, the blow down valve 24, and a pressure control valve 66, variable frequency pumps (not shown), or combinations thereof coupled to the boiler drum. In one embodiment, the liquid level control unit 42 automatically manipulates the one or more control elements coupled to the boiler drum. In another embodiment, the manipulation of one or more elements coupled to the boiler drum is manual. In yet another embodiment, the manipulation of one or more elements coupled to the boiler drum may include both manual and automatic control steps.

In the conventional water level control approach, the controller is a reactive type controller i.e. the controller reacts only when the drum is subjected to a disturbance. In accordance with an exemplary embodiment of the present invention, the controller 38 is a "predictive" controller that adjusts "water volume inventory" in a way that is suited for a safe water level operation based on the drum state and the expected disturbances. The exemplary controller 38 undertakes corrective measures even before the disturbances affect the drum water level adversely. As discussed above, the controller 38 computes required water volume inventory based on estimated or measured drum states, or both such as current water level, drum pressure, drum temperature, feed water flow rate, steam flow rate, and predicted disturbances such as expected load and pressure transients. The required water volume inventory is defined as a best value within a predetermined range for continuous safe operation of the drum and may be updated continuously. The controller 38 generates appropriate actions based on the estimated water volume inventory. Continuous monitoring of information related to current and predicted drum states, and measured and/or expected disturbances facilitate accurate predictions on drum water volume inventory and ensure increased lead-time for suitable control actions. This would reduce drum related plant trips and result in safe operating conditions for the boiler drum.

It should also be noted herein that the water level set point is not maintained fixed. The required water volume inventory is updated based on continuous monitoring of the state of drum and known disturbances. The controller 38 computes the water volume inventory that is suitable for the particular operating condition and known disturbance of the boiler drum. As a result, the water level in the boiler drum is maintained within a safe limit.

Figure 3:
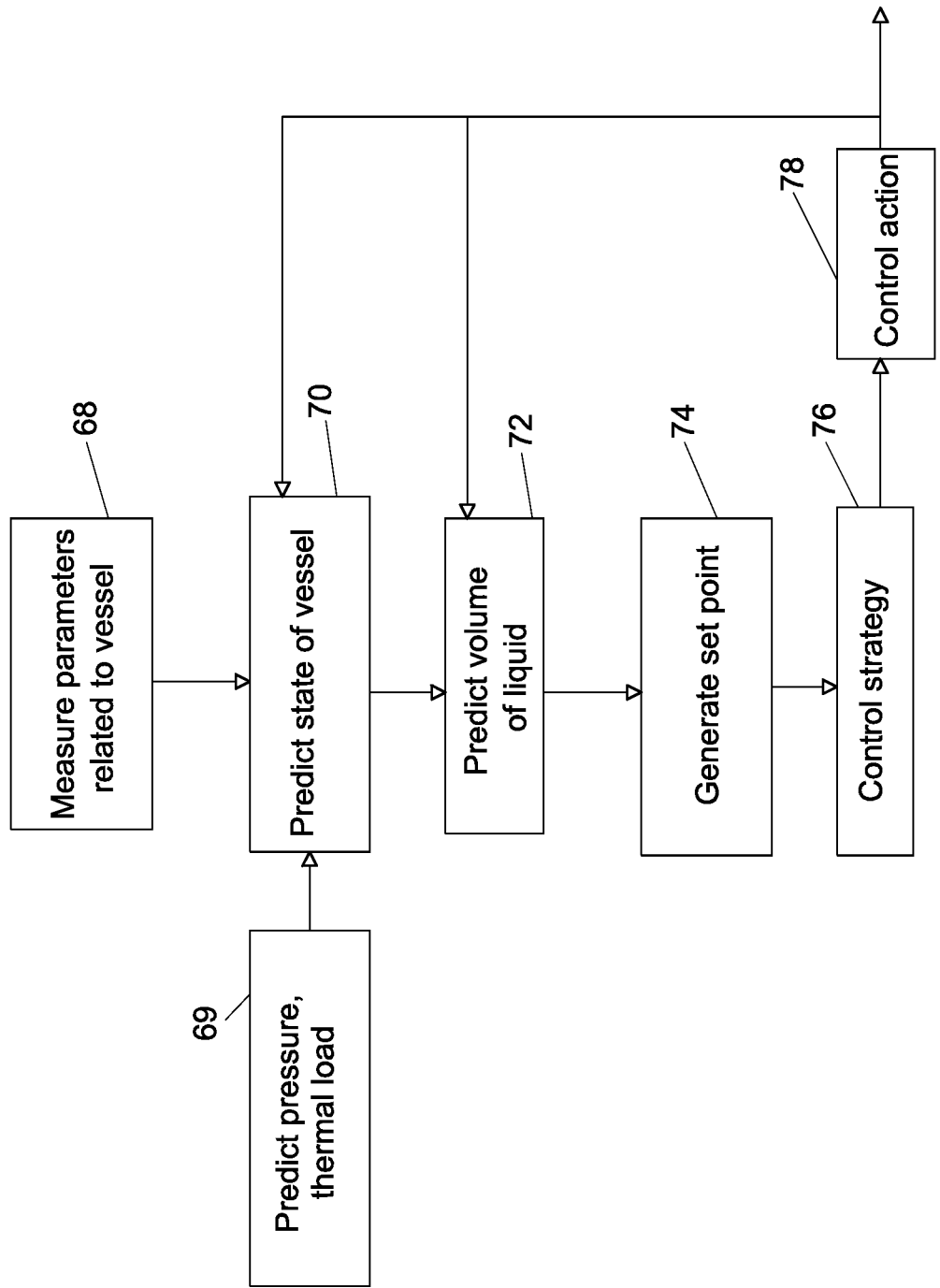
FIG. 3 is flow chart illustrating exemplary steps involved in method of controlling liquid level in a vessel in accordance with an exemplary embodiment of the present invention.

Referring to FIG. 3, a flow chart illustrating exemplary steps involved in a method of controlling liquid level in a vessel in accordance with an exemplary embodiment of the present invention is illustrated. The method includes measuring parameters related to the vessel via a plurality of sensors as represented by the step 68. In the illustrated embodiment, the parameters include liquid level in the vessel, pressure in the vessel, temperature of the vessel, vapor flow rate leaving the vessel, and feed-liquid flow rate entering the vessel.

The method also includes predicting pressure, thermal load, or combinations thereof in the vessel as represented by the step 69. The method further includes estimating/predicting a "state" of the vessel based on the output signals from the sensors, predicted pressure, thermal load, or combinations thereof in the vessel, and also an output of a liquid level control unit as represented by the step 70. The state of the vessel may include parameters including liquid level, pressure, temperature, feed liquid flow rate, steam flow rate, or combinations thereof related to the drum. The output of the liquid level control unit may include current output and previous output. A volume prediction unit predicts a volume of liquid in the vessel based on a state of the vessel, current output of the liquid level control unit and current and/or expected disturbances (variation in pressure, thermal load, or combinations thereof related to the vessel) within a predetermined time window/period as represented by the step 72. The method further includes generating a liquid level set point of the vessel based on the predicted volume of liquid in the vessel for the particular operating condition and predicted or expected disturbance as represented by the step 74. In one embodiment, the liquid level set point may be generated off-line based on a computer model of the system and expected disturbances.

The method also includes generating a control strategy based on the generated liquid level set point as represented by the step 76. The liquid level control unit controls the liquid level in the vessel based on the control strategy by manipulating one or more control elements coupled to the vessel as represented by the step 78. In one exemplary embodiment, the liquid level control unit generates output signals so as to control the water level in a boiler drum to a water level set point by manipulating the feed-water control valve, the blow down valve, and a pressure control valve, variable frequency pumps, or combinations thereof coupled to the boiler drum. In one embodiment, the liquid level control unit automatically controls the one or more elements coupled to the boiler drum. In another embodiment, the manipulating of one or more elements coupled to the boiler drum is manual. In yet another embodiment, the manipulating of one or more elements coupled to the boiler drum may include both manual and automatic control steps.

The controller generates appropriate actions based on the estimated water volume inventory. Continuous monitoring of information related to current and predicted drum states, and measured and/or expected disturbances facilitate accurate predictions on drum water volume inventory and ensure increased lead-time for suitable control actions. The required water volume inventory is updated based on continuous monitoring of the state of drum and known disturbances. As a result, the water level in the boiler drum is maintained within a safe limit.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A level control system for controlling a liquid level in a vessel containing a two-phase fluid, the system comprising:
a plurality of sensors configured to measure parameters related to the vessel, wherein the parameters comprise liquid level in the vessel, vapor flow rate leaving the vessel, pressure in the vessel, temperature of the vessel, and feed-liquid flow rate entering the vessel indicative of a state of the vessel;
a predictive controller configured to receive output signals from the plurality of sensors and predict a volume of liquid in the vessel based on output signals from the plurality of sensors and a variation in pressure, thermal load, or combinations thereof in the vessel; wherein the controller is configured to generate a liquid level set point of the vessel based on the predicted volume of liquid over a predetermined time period in the vessel and control a liquid level in the vessel based on the generated liquid level set point by manipulating one or more control elements coupled to the vessel.

2. The system of claim 1, wherein the controller is configured to predict a volume of liquid in the vessel based on the liquid level set point and control of liquid level in the vessel by manipulating one or more control elements coupled to the vessel.

3. The system of claim 1, wherein a variation in pressure, thermal load, or combinations thereof in the vessel comprises a measured variation, expected variation, or combinations thereof in pressure, thermal load, or combinations thereof in the vessel.

4. The system of claim 1, wherein the controller is configured to generate a liquid level set point of the vessel offline based on the predicted volume of liquid in the vessel.

5. The system of claim 1, wherein manipulating one or more control elements coupled to the vessel is performed manually, automatically, or combinations thereof.

6. A level control system for controlling a liquid level in a vessel containing a two-phase fluid, the system comprising:
 a plurality of sensors configured to measure parameters related to the vessel, wherein the parameters comprise liquid level in the vessel, vapor flow rate leaving the vessel, pressure in the vessel, temperature of the vessel, and feed-liquid flow rate entering the vessel indicative of a state of the vessel;
 a predictive controller configured to receive output signals from the plurality of sensors and control a liquid level in the vessel based on the output signals from the plurality of sensors; the controller comprising:
 a volume prediction unit configured to predict a volume of liquid in the vessel based on output signals from the plurality of sensors and a variation in pressure, thermal load, or combinations thereof in the vessel;
 a set point generation unit configured to generate a liquid level set point of the vessel based on the predicted volume of liquid over a predetermined time period in the vessel; and
 a liquid level control unit configured to control a liquid level in the vessel based on the generated liquid level set point by manipulating one or more elements coupled to the vessel.

7. The system of claim 6, wherein the controller is configured to predict the volume of liquid in the vessel based on the liquid level set point and control of liquid level in the vessel by manipulating one or more elements coupled to the vessel.

8. The system of claim 6, wherein a variation in pressure, thermal load, or combinations thereof in the vessel comprises a measured variation, expected variation, or combinations thereof in pressure, thermal load, or combinations thereof in the vessel.

9. The system of claim 6, wherein a set point generation unit is configured to generate a liquid level set point of the vessel offline based on the predicted volume of liquid in the vessel.

10. The system of claim 6, wherein the volume prediction unit is configured to predict an updated volume of liquid in the vessel based on output signals from the plurality of sensors and a variation in pressure, thermal load, or combinations thereof in the vessel for each control cycle of the system.

11. The system of claim 6, wherein the set point generation unit is configured to generate an updated liquid level set point of the vessel based on the updated predicted volume of liquid in the vessel.

12. A level control system for controlling a water level in a boiler drum containing a two-phase fluid; the system comprising:
 sensors configured to measure parameters related to the boiler drum, wherein the parameters comprise water level in the boiler drum; steam flow rate leaving the boiler drum; pressure in the boiler drum, temperature of the boiler drum, and feed-water flow rate entering the boiler drum indicative of a state of the boiler drum;
 a predictive controller configured to receive output signals from the plurality of sensors and predict a volume of water in the boiler drum based on output signals from the plurality of sensors and a variation in pressure, thermal load, or combinations thereof in the boiler drum; wherein the controller is configured to generate a water level set point of the boiler drum based on the predicted volume of water over a predetermined time period in the vessel; and control a water level in the boiler drum based on the generated water level set point by manipulating one or more control elements coupled to the boiler drum.

13. The system of claim 12, wherein the controller is configured to predict a volume of water in the boiler drum based on the water level set point and control of water level in the boiler drum by manipulating one or more control elements coupled to the boiler drum.

14. The system of claim 12, wherein a variation in pressure, thermal load, or combinations thereof in the boiler drum comprises a measured variation, expected variation, or combinations thereof in pressure, thermal load, or combinations thereof in the boiler drum.

15. The system of claim 12, wherein the controller is configured to generate a water level set point of the boiler drum offline based on the predicted volume of water in the boiler drum.

16. The system of claim 15, wherein the controller is configured to predict an updated volume of water in the boiler drum based on output signals from the plurality of sensors and a variation in pressure, thermal load, or combinations thereof in the boiler drum for each control cycle of the system.

17. The system of claim 16, wherein the controller is configured to generate an updated water level set point of the boiler drum based on the updated predicted volume of water in the boiler drum.

18. The system of claim 12, wherein manipulating one or more control elements coupled to the boiler drum is performed manually, automatically, or combinations thereof.

19. The system of claim 12, wherein manipulating one or more control elements comprises manipulating a pressure control valve, blow down valve, feed-water control valve, or combinations thereof coupled to the boiler drum.

20. The system of claim 12, wherein the system is configured for controlling water level in the boiler drum provided in a power generation plant.

21. A method for controlling a liquid level in a vessel containing a two-phase fluid, the method comprising:
 sensing parameters related to the vessel via a plurality of sensors; wherein sensing parameters comprises sensing liquid level in the vessel, vapor flow rate leaving the vessel, pressure in the vessel, temperature of the vessel, and feed-liquid flow rate entering the vessel indicative of a state of the vessel;
 predicting a volume of liquid in the vessel based on output signals from the plurality of sensors and a variation in pressure, thermal load, or combinations thereof in the vessel;
 generating a liquid level set point of the vessel based on the predicted volume of liquid over a predetermined time period in the vessel; and
 controlling a liquid level in the vessel based on the generated liquid level set point by manipulating one or more control elements coupled to the vessel.

22. The method of claim 21, further comprising predicting a volume of liquid in the vessel based on the liquid level set point and control of liquid level in the vessel by manipulating one or more control elements coupled to the vessel.

23. The method of claim 21, wherein a variation in pressure, thermal load, or combinations thereof in the vessel comprises a measured variation, expected variation, or combinations thereof in pressure, thermal load, or combinations thereof in the vessel.

24. The method of claim 21, further comprising generating a liquid level set point of the vessel offline based on the predicted volume of liquid in the vessel.

25. The method of claim 21, comprising manipulating one or more control elements coupled to the vessel manually, automatically, or combinations thereof.

\* \* \* \* \*